United States Patent
Brennan et al.

(10) Patent No.: US 8,342,069 B2
(45) Date of Patent: Jan. 1, 2013

(54) DEVICE AND METHOD FOR CONTROLLED BREACHING OF REINFORCED CONCRETE

(75) Inventors: Mike Brennan, Bristow, VA (US); Brett Goldstein, Potomac, MD (US); Luis Giraldo, Fairfax, VA (US); Rob Wallace, Woodbridge, VA (US); John Ryan, Fairfax, VA (US); Ed Dezelick, Germantown, MD (US); Mike Millspaugh, Burke, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/906,443

(22) Filed: Oct. 18, 2010

(65) Prior Publication Data

US 2011/0030539 A1     Feb. 10, 2011

Related U.S. Application Data

(62) Division of application No. 12/000,879, filed on Dec. 18, 2007, now Pat. No. 7,814,822.

(51) Int. Cl.
*B25D 9/00* (2006.01)
(52) U.S. Cl. .................................... 89/1.14
(58) Field of Classification Search ........... 89/1.14; 227/8, 9; 408/76; 29/254; 173/31, 38, 32, 173/36, 52; 248/678, 679, 52, 269, 200
See application file for complete search history.

(56) References Cited

U.S. PATENT DOCUMENTS

| | | | |
|---|---|---|---|
| 1,585,740 A * | 5/1926 | Saulia | 173/52 |
| 1,804,712 A | 5/1931 | Stevens et al. | |
| 1,932,106 A * | 10/1933 | Hirschberg | 173/52 |
| 2,053,508 A * | 9/1936 | Barney et al. | 173/131 |
| 2,101,159 A | 12/1937 | Stevens et al. | |
| 2,675,546 A | 4/1954 | Catlin | |
| 2,845,050 A * | 7/1958 | Wacker et al. | 173/46 |
| 2,945,236 A | 7/1960 | Kopf | |
| 3,016,539 A | 1/1962 | Marsh | |
| 3,038,159 A | 6/1962 | Helderman | |
| 3,335,805 A * | 8/1967 | Diez et al. | 173/121 |
| 3,451,492 A * | 6/1969 | Blomberg et al. | 173/162.2 |
| 3,559,272 A | 2/1971 | Hsu | |
| 3,613,431 A | 10/1971 | Meyer | |
| 3,622,060 A | 11/1971 | Gussalli | |
| 3,677,457 A | 7/1972 | Ramspeck et al. | |
| 3,721,032 A * | 3/1973 | Shum et al. | 42/106 |
| 3,743,048 A * | 7/1973 | Bakoledis | 181/230 |
| 3,768,412 A * | 10/1973 | Dardick | 102/436 |
| 4,067,400 A | 1/1978 | Nikolaev et al. | |

(Continued)

FOREIGN PATENT DOCUMENTS

EP     1231610 A2     8/2002

(Continued)

*Primary Examiner* — Michael Carone
*Assistant Examiner* — Reginald Tillman, Jr.
(74) *Attorney, Agent, or Firm* — Cantor Colburn LLP

(57) ABSTRACT

A breaching apparatus includes an impactor element and a self-contained energy source. The self-contained energy source enables the impactor element to impact a first surface of a structure. The impactor element is configured to transmit a localized shock wave through the structure upon impact. The self-contained energy source is capable of accelerating the impactor element to a velocity sufficient to induce spalling at a second surface of the structure. Multiple breaching apparatuses can be supported by a frame to facilitate simultaneous or successive breaching of the structure. The breaching apparatus can be used in a method to breach a concrete structure.

14 Claims, 8 Drawing Sheets

U.S. PATENT DOCUMENTS

| | | | |
|---|---|---|---|
| 4,068,790 A | 1/1978 | Osterle et al. | |
| 4,074,843 A | 2/1978 | Oesterle | |
| 4,493,376 A * | 1/1985 | Kopf | 173/210 |
| 4,750,568 A | 6/1988 | Roxton et al. | |
| 5,196,647 A | 3/1993 | Majors | |
| 5,243,761 A | 9/1993 | Sullivan et al. | |
| 5,251,532 A * | 10/1993 | Frommelt et al. | 89/1.14 |
| 5,329,685 A | 7/1994 | Gillespie | |
| 5,465,893 A | 11/1995 | Thompson | |
| 5,987,723 A | 11/1999 | McNally et al. | |
| 6,257,673 B1 | 7/2001 | Markham et al. | |
| 6,318,228 B1 | 11/2001 | Thompson | |
| 6,413,022 B1 | 7/2002 | Sarh | |
| 6,431,426 B1 | 8/2002 | Ehmig | |
| 6,739,405 B2 * | 5/2004 | Plietsch | 173/201 |
| 6,857,548 B1 | 2/2005 | Clark | |
| 6,889,591 B2 | 5/2005 | Sabates et al. | |
| 7,814,822 B2 * | 10/2010 | Brennan et al. | 89/1.14 |
| 2002/0112599 A1 * | 8/2002 | Sabates et al. | 89/1.14 |
| 2003/0015088 A1 | 1/2003 | Wursch et al. | |
| 2003/0173098 A1 | 9/2003 | Miner et al. | |
| 2004/0118577 A1 | 6/2004 | Morissette | |
| 2004/0200342 A1 | 10/2004 | Sansolo | |
| 2005/0284649 A1 | 12/2005 | Sabates et al. | |
| 2007/0086868 A1 * | 4/2007 | Ray | 408/76 |

FOREIGN PATENT DOCUMENTS

| | | |
|---|---|---|
| GB | 910754 A | 11/1962 |
| WO | 9507167 A2 | 3/1995 |

* cited by examiner

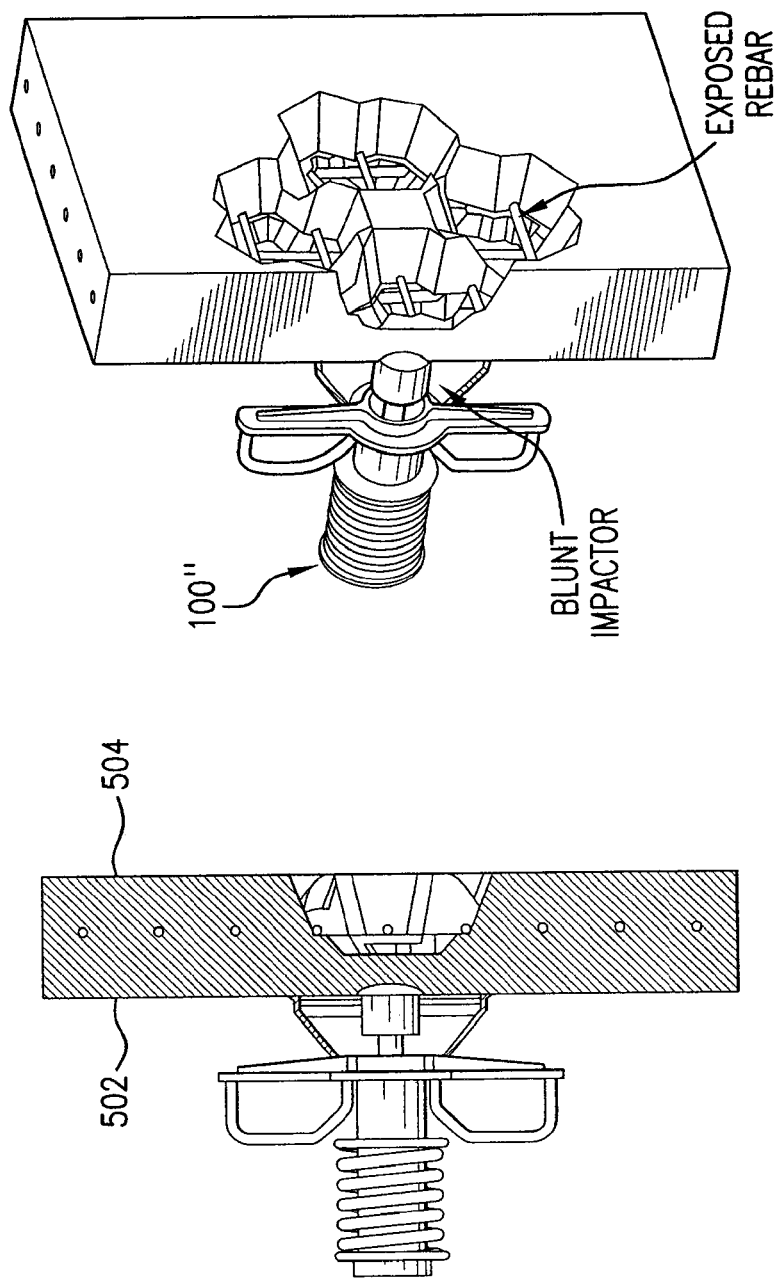

DEVICE AND METHOD FOR CONTROLLED BREACHING OF REINFORCED CONCRETE

This application is a divisional of application Ser. No. 12/000,879, filed Dec. 18, 2007 now U.S. Pat. No. 7,814,822, the entire disclosure of which is incorporated herein by reference.

STATEMENT REGARDING FEDERALLY-SPONSORED RESEARCH AND DEVELOPMENT

Part of the work performed during development of this invention utilized U.S. Government funds. The U.S. Government has certain rights in this invention.

TECHNICAL FIELD

Embodiments described herein relate generally to tools and methods for breaching concrete.

BACKGROUND

Urban search and rescue teams often need to create openings (called "breaching") in rigid structures, such as reinforced concrete walls, to reach victims in buildings after a disaster, such as an earthquake or a hurricane. To facilitate the search and rescue effort, breaching equipment is preferably portable, easy to operate, and rapid in effect while not destabilizing the building structure or threatening injury to operators or victims.

Conventional techniques for breaching concrete walls include gasoline and hydraulic powered diamond chain saws, gasoline and hydraulic powered circulars saws, diamond wire saws, large bore corers, hydraulic/pneumatic/electric impact tools, water jets, and hydraulic splitters. These techniques all can typically require several hours to breach a thick, heavily reinforced concrete wall, and the equipment may not be portable in some instances. Military teams also use explosives to quickly breach walls, but this is dangerous to victims and can destabilize the structure. Lasers have also been proposed for breaching applications, but size, safety, and power constraints generally make them infeasible.

Accordingly, devices and methods are needed that address one or more of the aforementioned shortcomings of conventional reinforced concrete breaching devices and methods.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention.

FIG. 5 illustrates a breaching technique in accordance with an embodiment disclosed herein.

In the drawings, like reference numbers indicate like elements. Additionally, the leftmost digit(s) of a reference number identifies the drawing in which the reference number first appears.

DETAILED DESCRIPTION

The embodiments described herein are particularly applicable to concrete and masonry based on the inherently weak tension and shear properties of these materials. Accordingly, the embodiments described herein refer specifically, and by way of example, to techniques for breaching reinforced concrete. However, it will be readily apparent to persons skilled in the relevant art(s) that the embodiments are equally applicable to techniques for breaching other structures. Changes can be made to the embodiments disclosed herein without departing from the scope of the invention, which is defined only by the scope of the appended claims.

The embodiment(s) described, and references in the specification to "one embodiment", "an embodiment", "an example embodiment", etc., indicate that the embodiment(s) described can include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
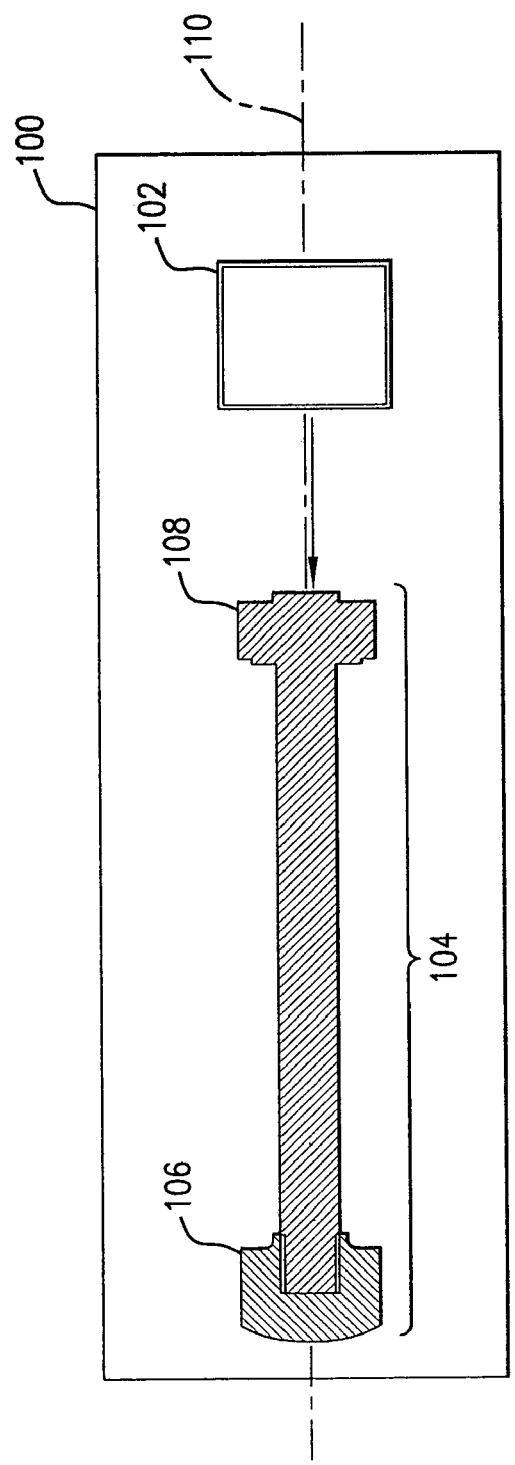
FIG. 1 illustrates an example of a breaching apparatus in accordance with an embodiment disclosed herein.

FIG. 1 illustrates an example implementation of a breaching apparatus 100 in accordance with an embodiment disclosed herein. Breaching apparatus 100 includes a self-contained energy source 102 and an impactor element 104. An energy source 102, which is preferably self-contained, provides energy to propel impactor element 104 upon a first surface 402 of a structure 400 (FIG. 4), thereby causing localized structural failure (i.e., spalling) at a second surface 404 of the structure 400. The first and second surfaces 402, 404 of the structure 400 are not the same. For example, the first and second surfaces 402, 404 of the structure 400 can be opposing surfaces. In the case of a reinforced concrete or cement wall, such as used in the support structure of a building, the impactor element 104 can be caused to impact an exterior surface of the concrete wall and the spalling occurs on the interior surface opposite the impact site.

The self-contained energy source 102 is said to be "self-contained" because the energy source 102 is not dependent upon external energy sources that are typically connected by hoses or wires, to provide the energy necessary to propel the impact element 104. Actuation of a self-contained energy source 102 causes the impactor element 104 to accelerate along an axis 110. The impactor element 104 impacts the first surface 402 of the structure 400, causing a localized shock wave to travel through the structure 400. The shock wave induces spalling at the second surface 404 of the structure 400. Accordingly, self-contained energy source 102 is capable of accelerating impactor element 104 to a velocity sufficient to induce spalling at the second surface 404.

The shock wave can create shear failure of a structural element embedded in the structure 400, though the scope of the embodiments are not limited in this respect. For instance, transmitting the shock wave through reinforced concrete can cause shear failure of the rebar in the concrete. Moreover, some of the imparted shock energy can transmit along the rebar, causing separation of the surrounding concrete from the rebar surface, further weakening the structure 400 near the point of impact.

The self-contained energy source 102 can utilize any suitable type of energy to accelerate the impactor element 104. For example, the energy source 102 can utilize powder actuated cartridges, similar to firearm or artillery shells, compressed air, combustible gas, etc., or any combination thereof.

In FIG. 1, the impactor element 104 includes a piston 108 and an impactor head 106 for illustrative purposes, although persons skilled in the art will recognize that impactor element 104 can be a unitary member. The piston 108 can be configured to support a variety of different impactor heads. For instance, different types of heads can be better suited for different types of applications and/or structures. The impactor head 106 can be a Moil point, a Hilti® self-sharpening point, a flat blade, a blunt, a mushroom blunt, or a blunt impactor, to provide some non-limiting examples.

Figure 3:
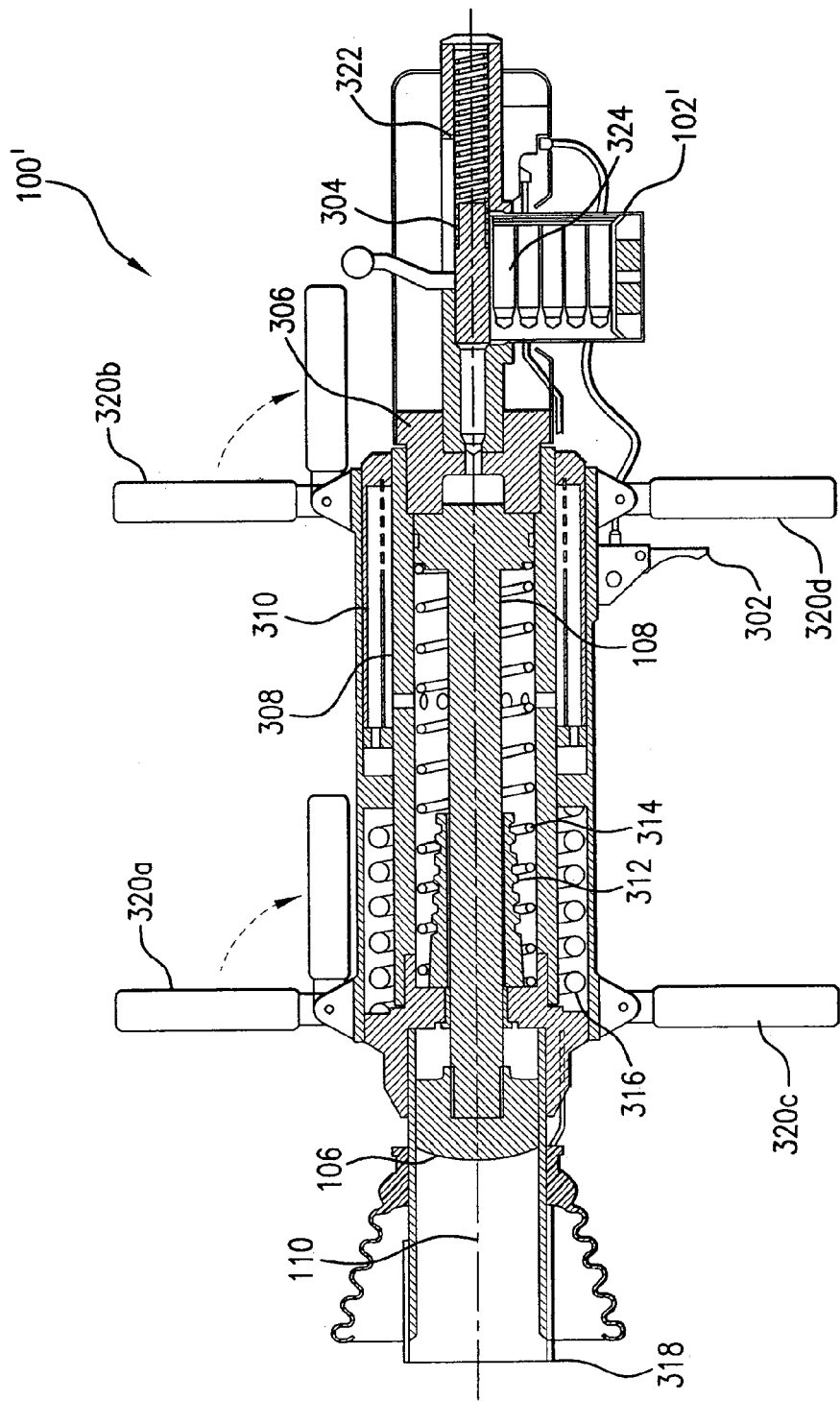
FIG. 3 illustrates an example of a breaching apparatus in accordance with an embodiment disclosed herein.

FIG. 3 illustrates a breaching apparatus 100' having a variety of optional features in accordance with an embodiment disclosed herein. In FIG. 3, the breaching apparatus 100' includes a chamber 308 to guide a piston 108 along an axis 110 when a self-contained energy source 102' is actuated. For example, a user can pull a trigger 302 to actuate the self-contained energy source 102'. When the trigger 302 is pulled, a firing element 322 ignites powder in a loaded powder actuated cartridge 324. The expanding combustion gases from the cartridge 324 increase the pressure in the chamber 308. The piston 108 is accelerated along axis 110 in a direction away from a breech 304, thereby compressing a return spring 314. The movement of the piston 108 along the axis 110 can cause a bumper 312 to be compressed, depending upon the force the piston 108 exerts on the return spring 314. For instance, the return spring 314 may not compress enough for bumper 312 to become compressed. The return spring 314 ensures that the piston 108 is returned to its pre-actuation position, so that the piston 108 can be accelerated again using another powder actuated cartridge 324, possibly the next in succession in a magazine. The bumper 312 works to stop the piston to protect the structural integrity of the apparatus 100' in the event that the tool is applied to and actuated with a weakened or compromised structure 400.

A firing element 322 is shown in FIG. 3 to be spring-loaded, although persons skilled in the relevant art will recognize that other types of firing elements can be used. For instance, firing element 322 can be a solenoid-driven firing element, if desired.

An energy source 102' is shown to include a plurality of powder actuated cartridges 324 for illustrative purposes, although other types of energy can be utilized. A bolt action breech 304 is shown for loading a single powder actuated cartridge 324 at a time. For example, the powder actuated cartridges 324 can be held in a magazine that advances the remaining charges each time the bolt action breech 304 removes a cartridge 324 from the magazine. Persons skilled in the relevant art(s) will recognize that other types of breeches can be used, including but not limited to a breech configured to facilitate semi-automatic loading of successive cartridges 324 of the plurality of powder actuated cartridges 324. Breech fitting 306 connects breech 304 to chamber 308.

Handles 320a-320d, as shown in FIG. 3, can be provided for the breaching apparatus 100', which according to one embodiment is hand-operated by one or more users. Handles 320a-b are shown to be retractable for illustrative purposes. A muffler assembly 310 can be incorporated to reduce the noise emitted from breaching apparatus 100' upon actuation of a cartridge 324. A recoil mitigation element 316 can be provided to reduce the recoil imposed by breaching apparatus 100' upon actuation of the cartridge 324. For example, the recoil mitigation element 316 can include any of a variety of springs, dampers, and/or elastomer materials to limit the force against users of breaching apparatus 100'.

The breaching apparatus 100' can include any of a variety of safety features, such as any safety features available for hand guns and/or rifles as well as construction equipment. For example, trigger 302 can have a safety locking feature, such as a thumb activated trigger locking device (not shown). A debris shield (not shown) can be included to protect users and/or the breaching apparatus 100' from debris and/or exhaust gases. An interlock element 318 is a safety feature that hinders actuation of the energy source 102' in response to the breaching apparatus 100' not being in contact with a structure 400. For example, the interlock element 318 can be pressure-activated to determine whether the interlock element 318 is in contact with a surface. In another example, the interlock element 318 can emit a signal that is reflected off the surface 400. In this example, the interlock element 318 is configured to determine a time between emission of the signal and detection of the reflected signal to determine a distance between the interlock element 318 and the surface 400. If the interlock element 318 is not within a predetermined proximity to (or in contact with) the surface 400, pulling the trigger 302 fails to actuate the energy source 102'.

Although the self-contained energy source 102' in FIG. 3 is shown to utilize powder actuated cartridges 324, persons skilled in the relevant art(s) will recognize that any suitable type of energy can be utilized. For example, the energy source 102' can include compressed air and/or gas that is charged to a predetermined pressure corresponding with a desired force of impact. In this example, a fast-acting valve allows the compressed air and/or gas to act against the piston 108, driving the impactor head 106 against a surface of a structure 400. Using compressed air and/or gas in lieu of a powder actuated charge can require the breaching apparatus 100' to be longer along the axis 110 to achieve the same impact force, because more distance can be needed to achieve the same velocity that is accomplished using the powder actuated charge. On the other hand, self-contained energy source 102' can supply compressed air and/or gas using currently available high pressure air breathing bottles, such as SCUBA or SCBA type bottles or the 3000 psi or 4500 psi breathing air tanks that search and rescue team members currently use. Compressed air operation does not produce noxious gases (combustion by-products) as the powder cartridges do. Elimination of the noxious gases provides a safer environment for rescue personnel and victims during confined space breaching operations.

The self-contained energy source 102' can include a combustible gas (e.g., a butane/air mixture), which can be ignited to expand the combustion gases, thereby propelling the impactor element 104 to the necessary velocity to induce spalling. Such combustible gas techniques can be similar to those utilized by conventional nail guns used in construction.

The breaching apparatus 100' can be portable, though the scope of the embodiments are not limited in this respect. Breaching apparatus 100' can be configured to transmit a shock wave through rock and/or soil. For example, the breaching apparatus 100' can be used to conduct seismographic or geological studies. In this example, the impactor head 106 can have a shape to facilitate such studies.

Figure 4:
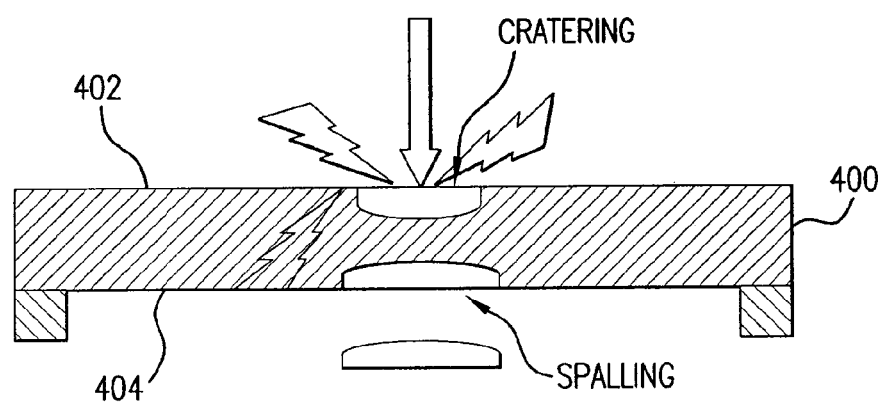
FIG. 4 illustrates a breaching technique in accordance with an embodiment disclosed herein.

FIG. 4 shows a structure 400 affected by a breaching technique in accordance with an embodiment disclosed herein. FIG. 4 illustrates that impacting a first surface 402 of structure 400 with an impactor head 106 can cause cratering at the first surface 402 and does cause spalling at a second surface 404. In FIG. 4, the second surface 404 is shown to oppose the first surface 402, though the scope of the embodiments described herein are not limited in this respect.

FIG. 5 illustrates spalling damage caused by a breaching technique in accordance with an embodiment disclosed herein. In FIG. 5, breaching apparatus 100" uses a blunt impactor head 106 to breach a reinforced concrete wall. When the blunt impactor head 106 impacts a first surface 502 of the wall, spalling at the second surface 504 causes the rebar within the wall to become exposed and separated from the concrete.

Figure 6C:
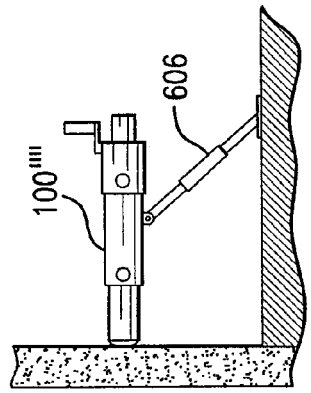
FIGS. 6A-6F show exemplary mounting techniques in accordance with embodiments disclosed herein.
Figure 6B:
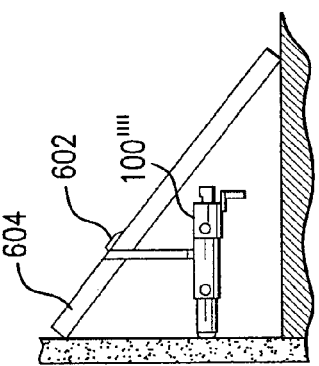
Figure 6A:
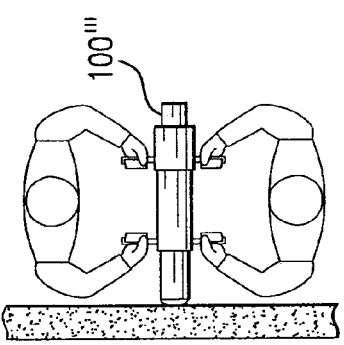

FIGS. 6A-6F show respective mounting techniques in accordance with embodiments disclosed herein. FIG. 6A illustrates that breaching apparatus 100''' can be hand-held against the surface 402 to be impacted by one or more persons. In FIG. 6A, two people are shown supporting the full weight of breaching apparatus 100''' for illustrative purposes. Any number of people (1, 2, 3, or more) can hold the breaching apparatus 100''. The person(s) holding breaching apparatus 100''' need not necessarily hold the full weight of breaching apparatus 100'''. For example, the person(s) can support a portion of the weight, while some other device (e.g., a mounting element, support, webbing strap, anchor, etc.) supports the remainder of the weight.

FIG. 6B illustrates that a webbing strap 602 can be used to suspend the breaching apparatus 100'''' from a support 604. Any number of webbing straps can be used. In FIG. 6B, a webbing strap 602 is shown to support the full weight of the breaching apparatus 100'''' for illustrative purposes, though the scope of the embodiments described herein are not limited in this respect. For instance, the webbing strap 602 can be made of flexible material that enables at least a portion of the weight of the breaching apparatus 100'''' to be supported by another means.

In FIG. 6C, a support element 606 supports breaching apparatus 100'''' against the surface 402 to be impacted. Support element 606 can be extendable and/or collapsible. Support element 606 can include a shock module to absorb at a portion of the recoil force resulting from actuating the energy source of breaching apparatus 100''''. Any number of supports can be used to support the breaching apparatus 100''''.

Figure 6F:
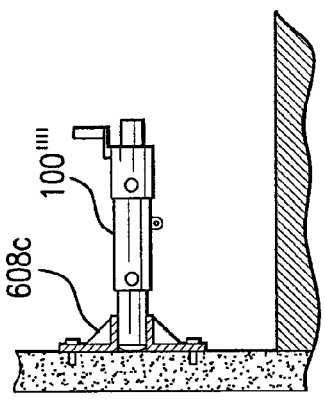
Figure 6E:
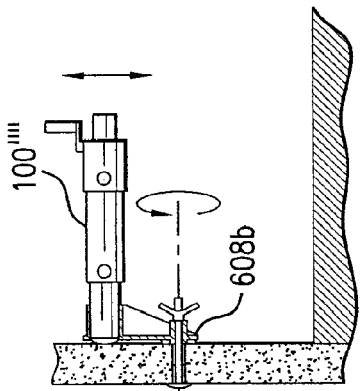
Figure 6D:
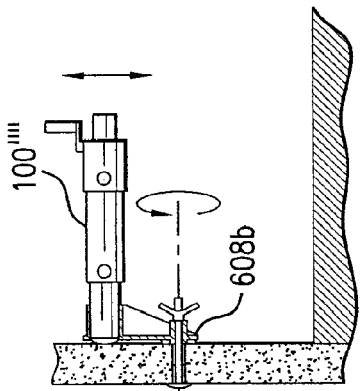

FIGS. 6D-F illustrate that the breaching apparatus 100'''' can be mounted to the surface 400 to be impacted using a respective mounting element 608a, b, or c. In FIG. 6D, mounting element 608a is shown to be a vacuum element, which is attached to a vacuum source 610 to enable mounting element 602a to remain mounted to the surface. In FIG. 6E, mounting element 608b is configured to enable breaching apparatus 100'''' to be rotated about a fixed point on the surface to be impacted. For example, the impactor element 104 of breaching apparatus 100'''' can be accelerated against the surface 402 at multiple points along the circumference of the circle defined by mounting apparatus 608b. In FIG. 6F, mounting element 608c includes anchor bolts to mount breaching apparatus 100'''' to the surface 402 to be impacted. In FIGS. 6D-F, mounting elements 608a-c are also considered support elements, because mounting elements 608a-c support the breaching apparatus 100'''' against the surface 402 to be impacted.

Figure 7:
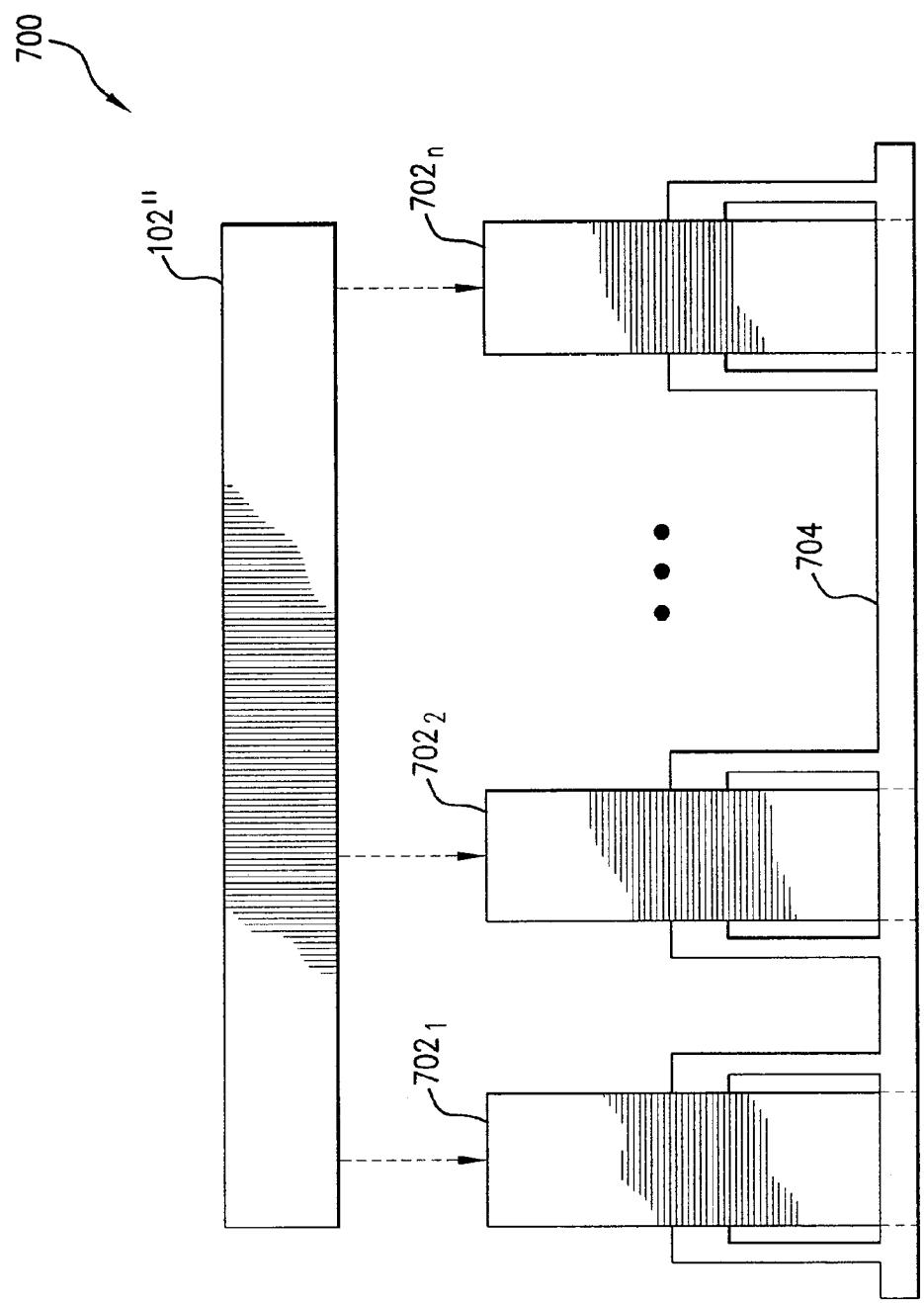
FIG. 7 illustrates a breaching system in accordance with an embodiment disclosed herein.

FIG. 7 illustrates an example of a breaching system 700 in accordance with an embodiment disclosed herein. The breaching system 700 includes a self-contained energy source 102", a plurality of breaching apparatuses $702_1$-$702_n$, and a frame 704. Each of the breaching apparatus $702_1$-$702_n$ includes an impactor element, such as impactor element 104 shown in FIG. 1. Each impactor element 104 is configured to transmit a localized shock wave through a structure upon impact with a first surface 402 thereof. Frame 704 structurally supports the plurality of breaching apparatuses $702_1$-$702_n$. Self-contained energy source 102" is capable of accelerating each of the impactor elements 104 to a velocity sufficient to induce spalling at a second surface 404 of the structure upon impact with the first surface 402. For example, self-contained energy source 102" can include a plurality of energy sources corresponding to respective breaching apparatus of the plurality of breaching apparatuses $702_1$-$702_n$. In another example, breaching apparatuses $702_1$-$702_n$ include the respective energy sources. In yet another example, self-contained energy source 102" includes a single energy source that is circulated among the plurality of breaching apparatuses $702_1$-$702_n$.

The breaching system 700 can include an actuation element configured to actuate self-contained energy source 102" to simultaneously accelerate the respective impactor elements of breaching apparatuses $702_1$-$702_n$. On the other hand, the actuation element can be configured to actuate self-contained energy source 102" independently for each of the breaching apparatuses $702_1$-$702_n$ to accelerate the respective impactor elements 104 successively. For instance, actuating breaching apparatuses $702_1$-$702_n$ sequentially can reduce destabilization of the structure, as compared to actuating breaching apparatuses $702_1$-$702_n$ simultaneously.

Figure 2:
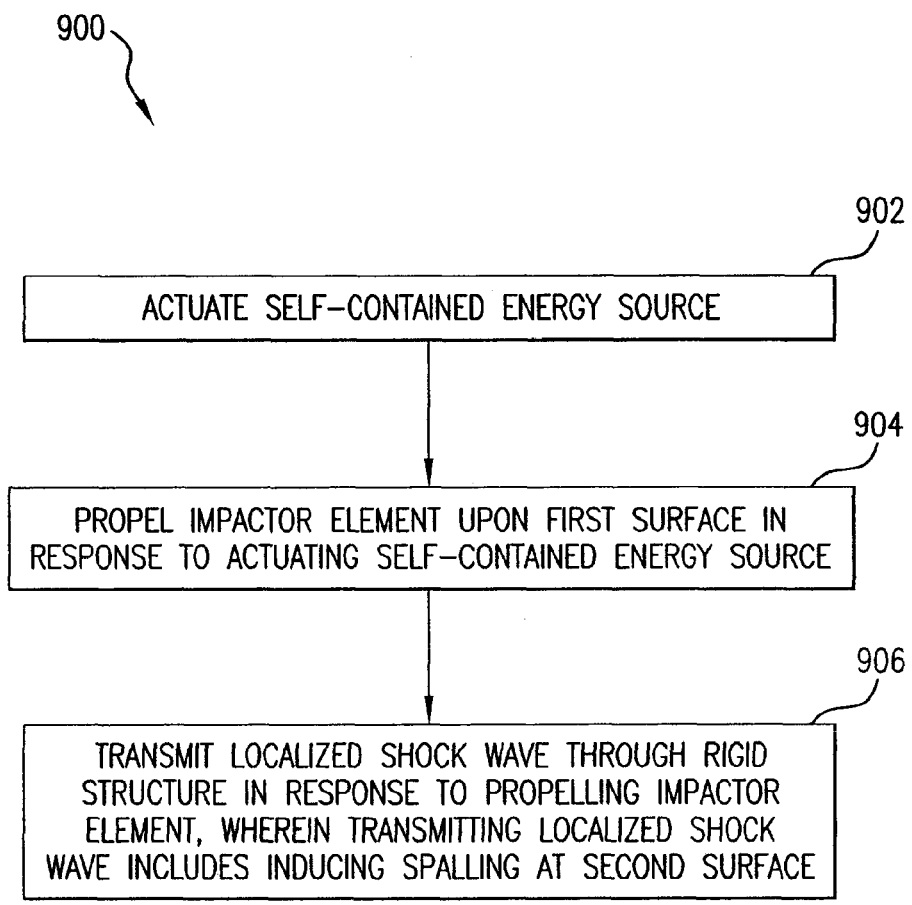
FIG. 2 illustrates a method in accordance with embodiments disclosed herein.
Figure 8:
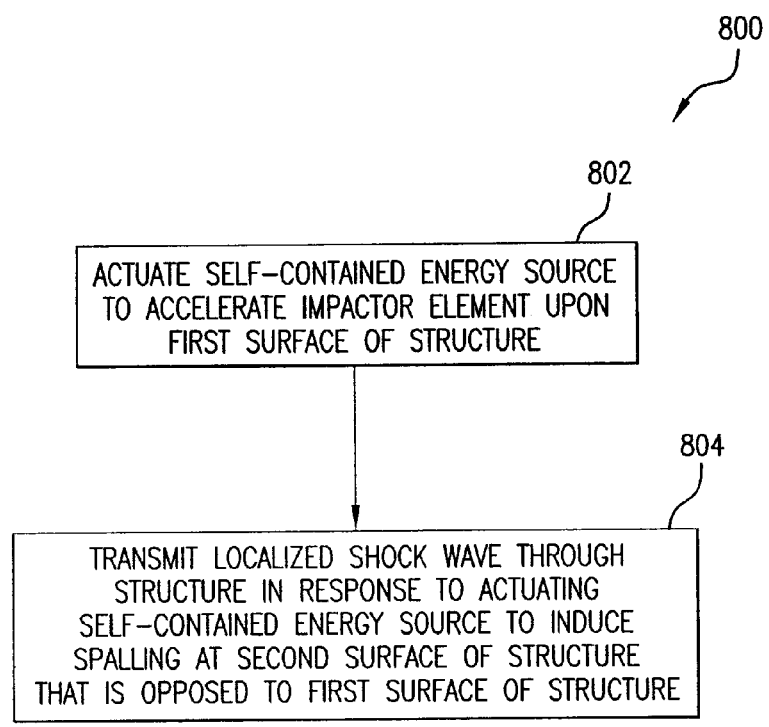
FIG. 8 illustrates a method in accordance with embodiments disclosed herein.

FIGS. 8 and 2 are flowcharts of methods in accordance with embodiments disclosed herein. The embodiments described herein, however, are not limited to the description provided by the flowcharts 800, 900. Rather, it will be apparent to persons skilled in the relevant art(s) from the teachings provided herein that additional steps or sequence of steps are within the scope and spirit of the embodiments.

Flowcharts 800, 900 will be described with continued reference to breaching system 100, 100' and components thereof described above in reference to FIGS. 1 and 3, though the method is not limited to those embodiments.

Referring now to FIG. 8, a self-contained energy source is actuated to accelerate an impactor element upon a first surface of a structure at step 802. For example, firing element 322 can actuate self-contained energy source 102 to accelerate impactor element 104 upon the first surface. At step 804, a localized shock wave is transmitted through the structure in response to actuating the self-contained energy source to induce spalling at a second surface of the structure that is opposed to the first surface of the structure. For instance, impactor element 104 can transmit the localized shock wave.

In FIG. 2, a self-contained energy source is actuated at step 902. For example, firing element 322 can actuate self-contained energy source 102. At step 904, an impactor element is propelled upon a first surface of a rigid structure in response to actuating the self-ontained energy source. For example, energy source 102 can propel impactor element 104 upon the first surface of the rigid structure. At step 906, a localized shock wave is transmitted through the rigid structure in response to propelling the impactor element. Transmitting the localized shock wave includes inducing spalling at a second surface of the structure that opposes the first surface. For instance, impactor element 104 can transmit the localized shock wave.

The embodiments described herein have a variety of applications. For example, the embodiments can provide rapid breaching of reinforced concrete in damaged or collapsed structures to allow urban search and rescue teams to reach trapped victims; rapid breaching by law enforcement personnel of secured doors and entryways; and/or rapid insertion of stakes or anchors into concrete or other tough materials. The embodiments can facilitate concrete demolition and/or impart shock waves in rock or soil for seismographic and geological studies.

Utilization of a self-contained energy source, as described herein, provides a variety of benefits, as compared to conventional breaching techniques. For example, the self-contained energy source eliminates the need for external energy sources that are typically connected by hoses or wires, to provide the energy necessary to breach a structure. Persons skilled in the relevant art(s) will recognize that the embodiments described herein can nevertheless be compatible with such equipment.

Powder actuated cartridges can supply a substantial amount of controlled energy in a relatively short time period. For instance, a .27 caliber cartridge used in commercial powder actuated nailers contains 460 Joules (J) of energy, and a 0.458 Winchester cartridge contains 6400J. Aircraft missile ejectors use even larger cartridges. In comparison, a typical commercially available hydraulic breaker can deliver a maximum of 65 J per blow, with many blows per second. However, this hydraulically actuated tool requires a 300 lb external hydraulic power unit, and an umbilical of hydraulic hoses. The power source can be tailored to the specific use of the device.

The powder actuated cartridge embodiments described herein are capable of combining the speed and efficiency of an impact type tool with the relatively small size and greater energy of powder actuated cartridges. This can allow a breaching apparatus to be human-portable and/or deliver more energy to a structure than conventional methods, resulting in faster breaching times. As compared to shape charges and other explosives, a cartridge based breaching apparatus is safer and easier to use, for example, because the controlled propellant burn is contained inside the breaching apparatus, and the energy can be applied incrementally to adapt to a given situation.

The powder actuated cartridges utilized by a breaching apparatus can be similar to those used by commercial concrete nail guns, for example, though the cartridges can be larger.

Example embodiments of methods, systems, and components thereof have been described herein. As noted elsewhere, these example embodiments have been described for illustrative purposes only, and are not limiting. Other embodiments and modifications, though presently unforeseeable, of the embodiments described herein are possible and are covered by the invention. Such other embodiments and modifications will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed as new and desired to be protected by Letters Patent of the United States is:

1. An apparatus, comprising:
   means for impacting a first surface of a concrete structure and producing spalling at a second surface of the structure by a localized shock wave, wherein said impacting means includes a blunt impactor face configured to transmit said localized shock wave through the structure, said blunt impactor face having an axially-outwardly curved surface for transmitting said shock wave into said structure, and wherein said curved surface of said blunt impactor face is arranged to face said first surface of said concrete structure during transmission of said localized shock wave into said structure;
   means for accelerating the means for impacting to induce spalling at the second surface, wherein the means for accelerating is self-contained, and wherein said accelerating means includes a powder actuated cartridge;
   a trigger for actuating said powder actuated cartridge while said apparatus is held in a stationary position; and
   an interlock element projecting forwardly of the impactor face to prevent the impactor face from being in direct contact with the first surface when the means for accelerating the means for impacting is primed for firing.

2. The apparatus of claim 1, further comprising: a bolt action breech to facilitate utilization of successive cartridges.

3. The apparatus of claim 1, further comprising: a breech configured to facilitate semi-automatic loading of successive cartridges.

4. The apparatus of claim 3, further comprising: a return spring to enable semi-automatic operation of the apparatus, wherein the apparatus is configured to accelerate the impactor face in a first direction along an axis, and wherein the return spring is configured to accelerate the impactor face in a second direction along the axis that is opposite the first direction.

5. The apparatus of claim 1, wherein the apparatus is portable.

6. The apparatus of claim 1, further comprising: at least one handle to enable hand-held operation of the apparatus.

7. The apparatus of claim 1, further comprising a piston chamber, and wherein said piston chamber includes a wall, and said impacting means includes a piston connected to said blunt impactor face, said piston including an elongated connecting member and a piston face, said connecting member being located between said blunt impactor face and said piston face, and said connecting member and said piston face being located within said chamber, and wherein said powder actuated cartridge is opposed to said piston face, for applying combustion gas toward said piston face within said piston chamber, and wherein said apparatus includes a recoil mechanism for venting said combustion gas from said piston chamber, said recoil mechanism including at least one opening extending through said wall of said piston chamber, between said blunt impactor face and said piston face.

8. The apparatus of claim 7, further comprising a muffler assembly, surrounding said opening extending through said wall of said piston chamber, for reducing noise generated by said apparatus.

9. The apparatus of claim 8, wherein said recoil mechanism further comprises a spring-biased movable element and handles, said spring-biased movable element being located outside of said piston chamber, and said handles being attached to said spring-biased movable element.

10. An apparatus that is configured to breach a rigid concrete structure having first and second opposing surfaces, said apparatus comprising:
   a piston chamber;
   an impactor element having a blunt impactor face configured to transmit a localized shock wave through the rigid concrete structure to the second surface of the rigid concrete structure upon impact of the blunt impactor face with the first surface, said blunt impactor face having an axially-outwardly curved surface for transmitting said shock wave into said structure, and said impactor element including a piston connected to said blunt impactor face, said piston being aligned with an axis and including a connecting member and a piston face, said connecting member being located between said blunt impactor face and said piston face, and said connecting member and said piston face being located within said piston chamber, and wherein said curved surface of said blunt impactor face is transverse to said axis of said piston, such that said curved surface faces said first surface of said rigid concrete structure during said impact of said blunt impactor face with said first surface;

an energy source capable of accelerating the impactor element to cause said localized shock wave to travel through said rigid concrete structure and thereby induce spalling at the second surface upon one or more impacts with the first surface, to thereby breach said rigid concrete structure, and wherein said energy source includes at least one powder actuated cartridge opposed to said piston face, for causing combustion gas to expand toward said piston face and into said piston chamber;

an intermediate chamber, located between said piston face and said powder actuated cartridge, for receiving said combustion gas from said cartridge before said gas is applied to said piston face, said intermediate chamber having a cross-sectional area in a lateral direction perpendicular to said axis, and wherein said piston face of said piston has a cross-sectional area, and wherein said cross-sectional sear of said intermediate chamber is smaller than said cross-sectional area of said piston face, such that said combustion gas expands in said lateral direction as said gas exits said intermediate chamber and enters said piston chamber; and an interlock element projecting forwardly of the impactor face to prevent the impactor face from being in direct contact with the first surface when the energy source is primed for firing.

11. The apparatus of claim 10, further comprising a breech fitting connected to said piston chamber, said intermediate chamber being located within said breech fitting.

12. The apparatus of claim 11, wherein said breech fitting has an annular wall for abutting a portion of said piston face, and wherein said intermediate chamber has an opening located within said annular wall for fluid communication with said piston chamber.

13. An apparatus, comprising:
an impactor configured to transmit a shock wave through a structure and including an axially-outwardly curved surface for transmitting the shock wave into the structure, the curved surface being arranged to face a complementary surface of the structure during the shock wave transmission;
a self-contained accelerator, including a powder actuated cartridge, which is configured to accelerate the curved surface of the impactor toward the complementary surface of the structure such that an impact therewith induces spalling at a second surface of the structure;
a trigger configured to actuate the powder actuated cartridge with the apparatus disposed in a stationary position; and
an interlock element projecting forwardly of the impactor to prevent the impactor from being in direct contact with the structure when the self-contained accelerator is primed.

14. The apparatus according to claim 13, wherein the interlock element is configured to hinder actuation of the self-contained accelerator.

* * * * *